US012770884B2

(12) United States Patent
Minami

(10) Patent No.: US 12,770,884 B2
(45) Date of Patent: Oct. 20, 2026

(54) LITHIUM ION CONDUCTOR AND LITHIUM ION BATTERY

(71) Applicant: TOYOTA JIDOSHA KABUSHIKI KAISHA, Toyota (JP)

(72) Inventor: Keiichi Minami, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 656 days.

(21) Appl. No.: 18/210,276

(22) Filed: Jun. 15, 2023

(65) Prior Publication Data

US 2023/0411626 A1 Dec. 21, 2023

(30) Foreign Application Priority Data

Jun. 17, 2022 (JP) ................................ 2022-098370

(51) Int. Cl.

*H01M 4/62* (2006.01)
*H01M 4/02* (2006.01)
*H01M 4/131* (2010.01)
*H01M 10/0525* (2010.01)

(52) U.S. Cl.

CPC ........... *H01M 4/628* (2013.01); *H01M 4/131* (2013.01); *H01M 10/0525* (2013.01); *H01M 2004/027* (2013.01)

(58) Field of Classification Search

CPC .. H01M 4/131; H01M 4/628; H01M 10/0525; H01M 2004/027

See application file for complete search history.

(56) References Cited

U.S. PATENT DOCUMENTS

2008/0254363 A1* 10/2008 Matsui .............. H01M 10/0525 429/207
2020/0099104 A1* 3/2020 Watanabe ............. H01M 4/382

FOREIGN PATENT DOCUMENTS

CN 110137561 A * 8/2019 ........ H01M 10/0525
JP 2020-0198270 A 12/2020

OTHER PUBLICATIONS

Machine Translation of CN 110137561 A (Year: 2019).*

* cited by examiner

*Primary Examiner* — Sathavaram I Reddy
(74) *Attorney, Agent, or Firm* — Sughrue Mion, PLLC

(57) ABSTRACT

The lithium ion conductor of the present disclosure includes a first compound and a second compound, wherein the first compound is a complex halide represented by $LiGaX_4$ (X is one or more halogens), the second compound is tetrabutylammonium bis(trifluoromethanesulfonyl)imide, and the ratio of the second compound to the sum of the first compound and the second compound is more than 0 mol % and 30 mol % or less.

10 Claims, 2 Drawing Sheets

LITHIUM ION CONDUCTOR AND LITHIUM ION BATTERY

CROSS-REFERENCE TO RELATED APPLICATION

This application claims priority to Japanese Patent Application No. 2022-098370 filed on Jun. 17, 2022, incorporated herein by reference in its entirety.

BACKGROUND

1. Technical Field

The present application discloses a lithium ion conductor and a lithium ion battery.

2. Description of Related Art

Japanese Unexamined Patent Application Publication No. 2020-198270 (JP 2020-198270 A) discloses a solid electrolyte including a lithium salt, a sulfide solid electrolyte, and an organic electrolyte having a predetermined elastic modulus ratio as a solid electrolyte constituting a solid electrolyte layer of an all-solid-state lithium ion battery. The organic electrolyte disclosed in JP 2020-198270 A has a property that, when heated, the ratio of the storage elastic modulus to the loss elastic modulus decreases to less than 1. In JP 2020-198270 A, by heating a solid electrolyte layer containing a lithium salt, a sulfide solid electrolyte, and an organic electrolyte, the organic electrolyte behaves as a liquid from a behavior as a solid with an increase in temperature, and the organic electrolyte becomes compatible with the sulfide solid electrolyte, whereby the ionic conductivity is improved.

SUMMARY

As disclosed in JP 2020-198270 A, a solid lithium ion conductor is employed in various battery chemical devices. The lithium conductor tends to be pressurized for a long period of time together with other materials. In this regard, a lithium ion conductor having a high ionic conductivity in a pressurized state is preferable.

The present application discloses the following aspects as means for solving the above problem.

First Aspect

A lithium ion conductor includes: a first compound; and a second compound. The first compound is a complex halide indicated by $LiGaX_4$ (where X is one or more halogens). The second compound is tetrabutylammonium bis(trifluoromethanesulfonyl)imide. A ratio of the second compound to a sum of the first compound and the second compound is more than 0 mol % and 30 mol % or less.

Second Aspect

In the lithium ion conductor according to the first aspect, the complex halide includes Br.

Third Aspect

A lithium ion battery includes: a positive electrode; an electrolyte layer; and a negative electrode. At least one of the positive electrode, the electrolyte layer, and the negative electrode includes the lithium ion conductor of the first or second aspect.

Fourth Aspect

In the lithium ion battery according to the third aspect, at least one of the positive electrode, the electrolyte layer, and the negative electrode includes the lithium ion conductor and a sulfide solid electrolyte.

The lithium ion conductor of the present disclosure is soft and has a property of increasing ion conductivity in a pressurized state, can cause a reaction such as a sintering reaction even at a low temperature of about room temperature, and has a high ionic conductivity at the time of pressurization. When such a lithium ion conductor is included in at least one of an electrode and an electrolyte layer of a lithium ion battery, for example, even when a crack occurs in the electrode or the electrolyte layer, the interface of the crack is repaired by the lithium ion conductor, and the interruption of the lithium ion conduction path is unlikely to occur.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

1. Lithium Ion Conductor

Figure 1:
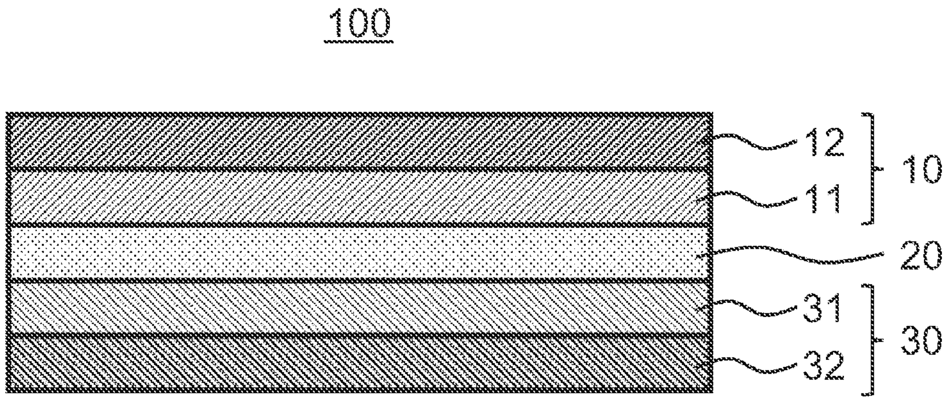
FIG. 1 schematically shows a configuration of a lithium ion battery.

The lithium ion conductor of the present disclosure includes a first compound and a second compound. The first compound is a complex halide represented by $LiGaX_4$ (X is one or more halogens). The second compound is tetrabutylammonium bis(trifluoromethanesulfonyl)imide (TBATFSI (sometimes referred to as TBATFSA)). The ratio of the second compound to the sum of the first compound and the second compound is more than 0 mol % and 30 mol % or less.

1.1 First Compound: Complex Halide Represented by $LiGaX_4$

According to the present inventor's new knowledge, the complex halide represented by $LiGaX_4$ has a property of gradually improving the ionic conductivity by operating a "room temperature sintering mechanism" in which the interfacial resistivity disappears or decreases even at room temperature under pressure. On the other hand, when a lithium ion conductor is applied to various electrochemical devices, the lithium ion conductor may be under pressure. Therefore, the lithium ion conductor of the present disclosure easily exhibits high ion conductivity in various electrochemical devices. Further, since the composite halide is relatively soft, the composite halide may follow deformation of the surrounding material or the like. That is, a gap caused by deformation, cracking, or the like of the material is filled by the lithium ion conductor of the present disclosure, and thus it is difficult to cause interruption of the ion conduction path or the like.

Whether or not the complex halide represented by $LiGaX_4$ is contained in the lithium ion conductor can be confirmed by X-ray diffractometry or the like. That is, when an X-ray diffraction peak using CuKα as a ray source is obtained for the lithium ion conductor of the present disclosure, a diffraction peak derived from $LiGaX_4$ is included in the X-ray diffraction peak. As far as the inventor has confirmed, the diffraction peak derived from $LiGaX_4$ varies depending on the type of X, but the diffraction peak derived from $LiGaCl_4$ appears at 15.3°±1°, 19.4°±1°, and 27.6°±1°, for example. The diffracted peaks from $LiGaBr_4$ appear at 14.2°±1°, 26.0°±1°, and 29.2°±1°. The diffracted peaks from $LiGaI_4$ appear at 15.0°±1°, 16.3°±1°, and 25.4°±1°.

In the complex halide represented by $LiGaX_4$, X is one or more halogens, and may be at least one selected from the group consisting of Cl, Br and I, for example. According to the present inventor's new knowledge, when the composite halide includes one or two or more of the following configurations (1) to (5), the increase rate of the ionic conductivity when maintained in a pressurized state tends to be particularly large, which is more preferable as a lithium ion conductor.

(1) The complex halide includes Br.

(2) The complex halide includes Cl.

(3) The composite halide includes a plurality of halogens.

(4) The complex halide includes Br and Cl.

(5) The complex halide includes Br and I.

According to the findings of the present inventors, when the complex halide contains Br as a halogen, in particular, when the complex halide contains at least one of Cl and I together with Br, an increasing ratio of ionic conductivity when maintained under pressure is more likely to be increased. There is no particular limitation on the molar ratio of Cl and I to Br, and any molar ratio may ensure a higher ionic conductivity. In addition, when the complex halide contains Cl and I as the halogen, when the molar ratio of Cl to the sum of Cl and I is 50 mol % or more, the ionic conductivity is particularly likely to be increased when the complex halide is maintained under pressure.

In the lithium ion conductor of the present disclosure, the complex halide may have a crystalline structure composed of a plurality of types of $LiGaX_4$, or may have a eutectic structure composed of a plurality of types of $LiGaX_4$. That is, in the above-described complex halide, a plurality of types of $LiGaX_4$ may be dissolved or replaced with each other to have a structure or a structure that differs from the structure or the structure of the complex halide. The complex halide may have a eutectic structure of $LiGaBr_4$ and $LiGaCl_4$. The complex halide may have a eutectic structure of $LiGaBr_4$ and $LiGaI_4$. The complex halide may have a eutectic structure of $LiGaCl_4$ and $LiGaI_4$. The complex halide may have a eutectic structure of $LiGaBr_4$, $LiGaCl_4$, and $LiGaI_4$. The ratio of the plurality of types of $LiGaX_4$ is not particularly limited. For example, when the composite halide has a first composite halide of $LiGaXa_4$ (where Xa is one of Br, Cl and I) and a second composite halide of $LiGaXb_4$ (where Xb is a halogen that differs from Xa and is one of Br, Cl and I), the molar ratio of the first composite halide to the second composite halide (the first composite halide/the second composite halide) may be ¼ or more and 4 or less, 3/7 or more and 7/3 or less, and ⅔ or more and 3/2 or less.

1.2 Second Compound: TBATFSI

The disclosed lithium ion conductor includes a TBATFSI (second compound) together with the complex halide (first compound) described above. Here, the ratio of the second compound to the sum (100 mol %) of the first compound and the second compound is more than 0 mol % and 30 mol % or less. In other words, [the amount of the second compound (mol)]/[the amount of the first compound (mol)+the amount of the second compound (mol)] is greater than 0 and less than or equal to 0.3. The ratio of the second compound to the total of the first compound and the second compound in the lithium ion conductor can be specified by analyzing the kind and amount of the cation and the anion contained in the lithium ion conductor, the crystal phase contained in the lithium ion conductor, and the like.

As far as the inventor has confirmed, if the proportion of the second compound contained in the lithium ion conductor is too large, the amount of increase in the ion conductivity in the pressurized state becomes rather small, and the absolute value of the ion conductivity becomes small. As in the lithium ion conductor of the present disclosure, when the ratio of the second compound in the sum of the first compound and the second compound is more than 0 mol % and equal to or less than 30 mol %, the increase in the ion conductivity in the pressurized state is more likely to be larger than that in the lithium ion conductor composed of only the first compound, and the absolute value of the ion conductivity is more likely to be increased. The ratio of the second compound to the sum of the first compound and the second compound may be 1 mol % or more, 5 mol % or more, or 10 mol % or more, and may be 25 mol % or less, or 20 mol % or less.

As far as the inventor has confirmed, when the lithium ion conductor is not placed in the pressurized state, the ionic conductivity of the lithium ion conductor containing the first compound and the second compound tends to be lower than the ionic conductivity of the lithium ion conductor consisting only of the first compound. This is considered to be because the room temperature sintering mechanism does not proceed, and the ionic conductivity of the second compound alone is lower than the ionic conductivity of the first compound alone. However, when the lithium ion conductor is placed in a pressurized state, the ionic conductivity of the lithium ion conductor containing the first compound and the second compound increases, and the ionic conductivity of the lithium ion conductor containing the first compound and the second compound tends to be higher than the ionic conductivity of the lithium ion conductor consisting only of the first compound. This is considered to be because the first compound and the second compound exert some interaction in the pressurized state. For example, the presence of the second compound may accelerate the room temperature sintering mechanism and further reduce the interfacial resistance.

The ionic conductivity of the disclosed lithium ion conductor after being held under pressure may be, for example, 1.0 mS/cm or higher. This is comparable to the ionic conductivity of a sulfide-based solid electrolyte. Further, since the lithium ion conductor of the present disclosure contains an organic compound as the second compound, it has high flexibility. Therefore, when the lithium ion conductor of the present disclosure is applied to various electrochemical devices, the lithium ion conductor is more likely to follow the deformation of the surrounding material or the like. That is, a gap caused by deformation, cracking, or the like of the material is filled by the lithium ion conductor of the present disclosure, and thus it is difficult to cause interruption of the ion conduction path or the like.

1.3 Other Ingredients

In addition to the complex halide represented by $LiGaX_4$, the lithium ion conductor of the present disclosure may contain another halide. For example, LiX, $GaX_2$, $GaX_3$, $LiGaX_3$, and the like may be included. That is, in the lithium ion conductor of the present disclosure, the complex halide does not necessarily have to contain Li and Ga and X in a molar ratio of 1:1:4. In addition, the composite halide constituting the lithium ion conductor of the present disclosure is considered to be capable of eutectizing other lithium compounds, and is considered to exert the same effect at that time. For example, it is considered that at least one inorganic-based lithium compound selected from B-based lithium salt; Al based lithium salt; In based lithium salt; $LiPF_6$, $LiBF_4$; other halogen-based lithium salt such as $LiBH_4$ and LiCBH; hydride-based lithium salt such as $Li_3PS_4$, LPSI; lithium oxide such as LLZO, LPO, LLTO; other inorganic-based lithium compounds such as nitrates, hydroxides, sulfates, and carbonates; and the like, and the complex halide described above can be eutectized to soften the inorganic-based lithium compound or to improve lithium ion conductivity under pressure. Alternatively, an organic lithium salt such as an amide salt or an imide salt such as LiTFSA (LiTFSI, lithium bistrifluoromethanesulfonylimide, LiBETI (lithium bispentafluoroethanesulfonylimide), LiFSA (LiFSI, lithium bisfluorosulfonylimide), LiFTA (LiFTI, or lithium fluorosulfonyl (trifluoromethanesulfonyl) imide) can be combined with the above-described complex halide and TBATFSI.

In addition, the lithium ion conductor of the present disclosure may include an inorganic solid electrolyte other than the composite halide. As the inorganic solid electrolyte, for example, any one used as an inorganic solid electrolyte of a battery can be employed. The inorganic solid electrolyte may be a sulfide solid electrolyte containing at least Li and S as constituent elements. In particular, the performance of the sulfide solid electrolyte containing at least Li, S, and P as constituent elements is high, and the performance of the sulfide solid electrolyte containing at least one or more halogens based on $Li_3PS_4$ skeleton is also high. Examples of the sulfide solid electrolyte include $Li_2S—P_2S_5$, $Li_2S—SiS_2$, $LiI—Li_2S—SiS_2$, $LiI—Si_2S—P_2S_5$, $Li_2S—P_2S_5—LiI—LiBr$, $LiI—Li_2S—P_2S_5$, $LiI—Li_2S—P_2O_5$, $LiI—Li_3PO_4—P_2S_5$, and $Li_2S—P_2S_5—GeS_2$. The sulfide solid electrolyte may be amorphous or may be crystalline. The sulfide solid electrolyte may be, for example, particulate. Only one sulfide solid electrolyte may be used alone, or two or more sulfide solid electrolytes may be used in combination.

When used as an electrochemical device material, the lithium ion conductors of the present disclosure may be combined with other components depending on the type of electrochemical device. The other components may be appropriately determined depending on the specific use of the lithium ion conductor. For example, when a lithium ion conductor is used as an electrode material of a lithium ion battery, an active material, an electrolyte, a conductive auxiliary agent, a binder, and the like may be combined with the lithium ion conductor. When the lithium ion conductor is used as a material constituting the electrolyte layer of the lithium ion battery, other electrolytes, binders, and the like may be combined with the lithium ion conductor. Further, the lithium ion conductor of the present disclosure may contain various additives.

2. Lithium Ion Battery

The lithium ion conductor of the present disclosure is applicable, for example, as a lithium ion conductive material in a lithium ion battery. As shown in FIG. 1, a lithium ion battery 100 according to an embodiment includes a positive electrode 10, an electrolyte layer 20, and a negative electrode 30. Here, at least one of the positive electrode 10, the electrolyte layer 20, and the negative electrode 30 includes the lithium ion conductor of the present disclosure described above. As described above, the lithium ion conductor of the present disclosure is soft and greatly improves the ion conductivity when the pressurized state is maintained. Therefore, for example, when the battery is manufactured, the lithium ion conductor is deformed to fill the gap between the electrode and the electrolyte layer, and thus the filling ratio in the electrode and the electrolyte layer is likely to be increased. Further, even if cracks, peeling, or the like occur in the electrode or the electrolyte layer during use of the battery or the like, by filling the lithium ion conductor in the cracked portion or the peeled portion, it is possible to eliminate the gap due to cracks or peeling, such as interruption of the ion conduction path is less likely to occur. In addition, the lithium ion conductor of the present disclosure tends to be pressurized inside the lithium ion battery, and easily exhibits excellent lithium ion conductivity. Further, in a lithium ion battery using lithium metal, the effect of suppressing the generation of dendrites can be expected by using the lithium ion conductor of the present disclosure in combination. As described above, by including the lithium ion conductor of the present disclosure in at least one of the positive electrode 10, the electrolyte layer 20, and the negative electrode 30 of the lithium ion battery 100, the performance of the lithium ion battery 100 tends to be enhanced.

In the lithium ion battery 100, a solid electrolyte, another liquid electrolyte, or a liquid additive may be used in combination with the lithium ion conductor of the present disclosure. The lithium ion battery 100 may be, for example, an all-solid-state battery that does not include a liquid, or may include a solid electrolyte and a liquid. In particular, in the lithium ion battery 100, when at least one of the positive electrode 10, the electrolyte layer 20, and the negative electrode 30 includes the lithium ion conductor of the present disclosure and a solid electrolyte (particularly, a sulfide solid electrolyte), the lithium ion conductor of the present disclosure can follow deformation or cracking of the solid electrolyte, and even if a gap is generated due to deformation or cracking of the sulfide solid electrolyte, the gap is filled with the lithium ion conductor of the present disclosure, so that interruption or the like of the ion conduction path can be suppressed.

2.1 Positive Electrode

As illustrated in FIG. 1, the positive electrode 10 according to an embodiment may include the positive electrode active material layer 11 and the positive electrode current collector 12, and in this case, the positive electrode active material layer 11 may include the above-described lithium ion conductor.

2.1.1 Positive Electrode Active Material Layer

The positive electrode active material layer 11 includes a positive electrode active material, and may further optionally include an electrolyte, a conductive auxiliary agent, a binder, and the like. In addition, the positive electrode active material layer 11 may contain various additives. When the positive electrode active material layer 11 includes the lithium ion conductor of the present disclosure as an electrolyte, the positive electrode active material layer 11 may include a positive electrode active material in addition to the lithium ion conductor, and may optionally include other electrolytes, a conductive auxiliary agent, a binder, and various additives. The contents of each of the positive electrode active material, the electrolyte, the conductive aid, the binder, and the like in the positive electrode active material layer 11 may be appropriately determined in accordance with the target battery performance. For example, the content of the positive electrode active material may be 40% by mass or more, 50% by mass or more, or 60% by mass or more, and may be less than 100% by mass or 90% by mass or less, assuming that the entire positive electrode active material layer 11 (the entire solid content) is 100% by mass. The shape of the positive electrode active material layer 11 is not particularly limited, and may be, for example, a sheet shape having a substantially flat surface. Thickness of the positive electrode active material layer 11 is not particularly limited, for example, 0.1 μm or more, 1 μm or more, may be 10 μm or more or 30 μm or more, 2 mm or less, 1 mm or less, 500 μm or less or 100 μm or less.

As the positive electrode active material, a material known as a positive electrode active material of a lithium ion battery may be used. Among the known active materials, a material having a potential (charge-discharge potential) at which lithium ions are occluded and released is more noble than that of a negative electrode active material described later can be used as the positive electrode active material. As the positive electrode active material, various lithium-containing composite oxides such as lithium cobalt oxide, lithium nickelate, lithium manganate, lithium manganese nickel cobalt oxide, and a spinel-based lithium compound may be used, an oxide-based active material other than the lithium-containing composite oxide may be used, or a sulfur-based active material such as elemental sulfur or a sulfur compound may be used. Only one positive electrode active material may be used alone, or two or more positive electrode active materials may be used in combination. The positive electrode active material may be, for example, in a particulate form, and the size thereof is not particularly limited. The particles of the positive electrode active material may be solid particles, hollow particles, or particles having voids. The particles of the positive electrode active material may be primary particles or secondary particles in which a plurality of primary particles is aggregated. The mean particle size (D50) of the particles of the positive electrode active material may be more than 1 nm, more than 5 nm, or more than 10 nm, or may be less than 500 μm, less than 100 μm, less than 50 μm, or less than 30 μm. The average particle diameter D50 referred to in the present application is a particle diameter (median diameter) at an integrated value of 50% in a volume-based particle size distribution obtained by a laser diffraction and scattering method.

The surface of the positive electrode active material may be covered with a protective layer containing an ion conductive oxide. That is, the positive electrode active material layer 11 may include a composite including the positive electrode active material described above and a protective layer provided on the surface thereof. As a result, the reaction between the positive electrode active material and the sulfide (for example, the above-described sulfide solid electrolyte or the like) is easily suppressed. When the battery is a lithium ion battery, examples of the ion conductive oxide that covers and protects the surface of the positive electrode active material include $Li_3BO_3$, $LiBO_2$, $Li_2CO_3$, $LiAlO_2$, $Li_4SiO_4$, $Li_2SiO_3$, $Li_3PO_4$, $Li_2SO_4$, $Li_2TiO_3$, $Li_4Ti_5O_{12}$, $Li_2Ti_2O_5$, $Li_2ZrO_3$, $LiNbO_3$, $Li_2MoO_4$, and $Li_2WO_4$. The coverage (area ratio) of the protective layer may be, for example, 70% or more, 80% or more, or 90% or more. The thickness of the protective layer may be, for example, 0.1 nm or more or 1 nm or more, or may be 100 nm or less or 20 nm or less.

The electrolyte that may be included in the positive electrode active material layer 11 may be a solid electrolyte, a liquid electrolyte, or a combination thereof.

As the solid electrolyte, a known solid electrolyte of a lithium ion battery may be used. The solid electrolyte may be an inorganic solid electrolyte or an organic polymer electrolyte. In particular, the inorganic solid electrolyte is excellent in ionic conductivity and heat resistance. As the inorganic solid electrolyte, in addition to the sulfide solid electrolyte described above, for example, lithium lanthanum zirconate, LiPON, $Li_{1+X}Al_XGe_{2-X}(PO_4)_3$, Li—SiO based glasses, oxide solid electrolytes such as Li—Al—S—O based glasses can be exemplified. In particular, the sulfide solid electrolyte, in particular, has a high-performance sulfide solid electrolyte including at least Li, S, and P as constituent elements. When the positive electrode active material layer 11 includes a solid electrolyte (in particular, a sulfide solid electrolyte) together with the lithium ion conductor of the present disclosure, an effect of repairing cracking or the like of the solid electrolyte by the lithium ion conductor of the present disclosure can be expected. The solid electrolyte may be amorphous or crystalline. The solid electrolyte may be in the form of particles, for example. Only one type of solid electrolyte may be used alone, or two or more types may be used in combination.

The electrolytic solution may contain, for example, lithium ions as carrier ions. The electrolytic solution may be, for example, a nonaqueous electrolytic solution. For example, as the electrolytic solution, a solution obtained by dissolving a lithium salt in a carbonate-based solvent at a predetermined concentration can be used. Examples of the carbonate solvent include fluoroethylene carbonate (FEC), ethylene carbonate (EC), dimethyl carbonate (DMC) and the like. Examples of the lithium salt include hexafluoride phosphate.

Examples of the conductive auxiliary agent that can be included in the positive electrode active material layer 11 include carbon materials such as vapor-phase carbon fibers (VGCF), acetylene black (AB), Ketjen black (KB), carbon nanotubes (CNT), and carbon nanofibers (CNF); and metallic materials such as nickel, aluminum, and stainless steel. The conductive aid may be, for example, in the form of particles or fibers, and its size is not particularly limited. Only one type of conductive aid may be used alone, or two or more types may be used in combination.

Examples of the binder that can be contained in the positive electrode active material layer 11 include a butadiene rubber (BR) binder, a butylene rubber (IIR) binder, an acrylate butadiene rubber (ABR) binder, a styrene butadiene rubber (SBR) binder, a polyvinylidene fluoride (PVdF) binder, a polytetrafluoroethylene (PTFE) binder, a polyimide (PI) binder, and a polyacrylic acid-based binder. Only one type of conductive aid may be used alone, or two or more types may be used in combination.

2.1.2 Positive Electrode Current Collector

As shown in FIG. 1, the positive electrode 10 may include the positive electrode current collector 12 in contact with the positive electrode active material layer 11. As the positive electrode current collector 12, any general positive electrode current collector of the battery can be adopted. Further, the positive electrode current collector 12 may be in the form of a foil, a plate, a mesh, a punching metal, a foam, or the like. The positive electrode current collector 12 may be made of a metal foil or a metal mesh. In particular, a metal foil is excellent in handleability and the like. The positive electrode current collector 12 may be made of a plurality of foils. Examples of the metal constituting the positive electrode current collector 12 include Cu, Ni, Cr, Au, Pt, Ag, Al, Fe, Ti, Zn, Co, and stainless steel. In particular, from the viewpoint of ensuring oxidation resistance, the positive electrode current collector 12 may contain Al. The positive electrode current collector 12 may have some kind of coat layer on its surface for the purpose of adjusting resistance or the like. Further, the positive electrode current collector 12 may be a metal foil or a base material on which the above metal is plated or vapor-deposited. Further, when the positive electrode current collector 12 is composed of a plurality of metal foils, some kind of layer may be provided between the metal foils. The thickness of the positive electrode current collector 12 is not particularly limited. For example, the thickness may be 0.1 μm or more or 1 μm or more, or may be 1 mm or less or 100 μm or less.

In addition to the above configuration, the positive electrode 10 may have a general configuration as a positive electrode of a lithium ion battery. For example, the general configuration includes a tab and a terminal. The positive electrode 10 can be manufactured by applying a known method. For example, the positive electrode active material layer 11 can be easily formed by molding a positive electrode mixture containing the above-mentioned various components by a dry method or a wet method. The positive electrode active material layer 11 may be formed together with the positive electrode current collector 12, or may be formed separately from the positive electrode current collector 12.

2.2 Electrolyte Layer

The electrolyte layer 20 contains at least an electrolyte. The electrolyte layer 20 may include a solid electrolyte, and may optionally include a binder or the like. When the electrolyte layer 20 includes the lithium ion conductor of the present disclosure as an electrolyte, the electrolyte layer 20 may further include other electrolytes, binders, and various additives in addition to the lithium ion conductor. In this case, the content of the electrolyte, the binder, and the like in the electrolyte layer 20 is not particularly limited. Alternatively, the electrolyte layer 20 may include an electrolyte solution, and may further include a separator or the like for holding the electrolyte solution and preventing contact between the positive electrode active material layer 11 and the negative electrode active material layer 31. The thickness of the electrolyte layer 20 is not particularly limited, and may be, for example, 0.1 μm or more or 1 μm or more, or may be 2 mm or less or 1 mm or less.

The electrolyte included in the electrolyte layer 20 may be appropriately selected from the lithium ion conductor of the present disclosure and the electrolyte exemplified as the electrolyte that may be included in the positive electrode active material layer. For example, when the electrolyte layer 20 includes a solid electrolyte (particularly, a sulfide solid electrolyte) together with the lithium ion conductor of the present disclosure, an effect of repairing cracks or the like of the solid electrolyte by the lithium ion conductor of the present disclosure can be expected. The binder that may be included in the electrolyte layer 20 may be appropriately selected from those exemplified as the binder that may be included in the positive electrode active material layer described above. The electrolyte and the binder may be used alone or in combination of two or more. When the lithium ion battery is an electrolyte battery, the separator for holding the electrolyte may be a separator commonly used in lithium ion batteries, and examples thereof include resins such as polyethylene (PE), polypropylene (PP), polyester, and polyamide. The separator may have a single-layer structure or a multi-layer structure. Examples of the separator having a multi-layer structure include a separator having a two-layer structure of PE-PP, a separator having a three-layer structure of PP-PE-PP or PE-PP-PE, and the like. The separator may be made of a non-woven fabric such as a cellulose non-woven fabric, a resin non-woven fabric, or a glass fiber non-woven fabric.

2.3 Negative Electrode

As illustrated in FIG. 1, the negative electrode 30 according to an embodiment may include a negative electrode active material layer 31 and a negative electrode current collector 32. In this case, the negative electrode active material layer 31 may include the above-described lithium ion conductor.

2.3.1 Negative Electrode Active Material Layer

The negative electrode active material layer 31 includes a negative electrode active material, and may further optionally include an electrolyte, a conductive auxiliary agent, a binder, and the like. In addition, the negative electrode active material layer 31 may contain various additives. When the negative electrode active material layer 31 includes the lithium ion conductor of the present disclosure as an electrolyte, the negative electrode active material layer 31 may include a negative electrode active material in addition to the lithium ion conductor, and may optionally include other electrolytes, a conductive auxiliary agent, a binder, and various additives. The contents of each of the positive electrode active material, the electrolyte, the conductive aid, the binder, and the like in the negative electrode active material layer 31 may be appropriately determined in accordance with the target battery performance. For example, the content of the negative electrode active material may be 40% by mass or more, 50% by mass or more, or 60% by mass or more, and may be less than 100% by mass or 90% by mass or less, with the entire negative electrode active material layer 31 (the entire solid content) being 100% by mass. The shape of the negative electrode active material layer 31 is not particularly limited, and may be, for example, a sheet shape having a substantially flat surface. The thickness of the negative electrode active material layer 31 is not particularly limited. For example, it may be 0.1 μm or more, 1 μm or more, 10 μm or more, or 30 μm or more, 2 mm or less, 1 mm or less, 500 μm or less, or 100 μm or less.

As the negative electrode active material, various materials in which a potential (charge-discharge potential) for occluding and releasing predetermined ions is a lower potential than that of the positive electrode active material may be employed. For example, a silicon-based active material such as Si, Si alloy, and silicon oxide; a carbon-based active material such as graphite and hard carbon; various oxide-based active materials such as lithium titanate; metallic lithium, lithium alloy, and the like can be adopted. Only one type of the negative electrode active material may be used alone, or two or more types may be used in combination. The shape of the negative electrode active material may be any general shape as the negative electrode active material of the lithium ion battery. For example, the negative electrode active material may be in the form of particles. The negative electrode active material particles may be primary particles or secondary particles each of which includes multiple primary particles that are aggregated. The average particle size (D50) of the negative electrode active material particles may be, for example, 1 nm or more, 5 nm or more, or 10 nm or more, or may be 500 μm or less, 100 μm or less, 50 μm or less, or 30 μm or less. Alternatively, the negative electrode active material may be in the form of a sheet (foil-shape, film-shape) such as lithium foil. That is, the negative electrode active material layer 31 may be made of a sheet of the negative electrode active material.

Examples of the electrolyte that may be included in the negative electrode active material layer 31 include the above-described lithium ion conductor, the above-described solid electrolyte, an electrolyte solution, or a combination thereof of the present disclosure. For example, when the negative electrode active material layer 31 includes a solid electrolyte (particularly, a sulfide solid electrolyte) together with the lithium ion conductor of the present disclosure, an effect of repairing cracks or the like of the solid electrolyte by the lithium ion conductor of the present disclosure can be expected. Examples of the conductive aid that can be contained in the negative electrode active material layer 31 include the above-mentioned carbon materials and the above-mentioned metal materials. The binder that can be contained in the negative electrode active material layer 31 may be appropriately selected from, for example, those exemplified as the binder that can be contained in the positive electrode active material layer 11 described above. The electrolyte and the binder may be used alone or in combination of two or more.

2.3.2 Negative Electrode Current Collector

As shown in FIG. 1, the negative electrode 30 may include the negative electrode current collector 32 in contact with the negative electrode active material layer 31. As the negative electrode current collector 32, any general negative electrode current collector of the battery can be adopted. Further, the negative electrode current collector 32 may be in the form of a foil, a plate, a mesh, a punching metal, a foam, or the like. The negative electrode current collector 32 may be a metal foil or a metal mesh, or may be a carbon sheet. In particular, a metal foil is excellent in handleability and the like. The negative electrode current collector 32 may be made of a plurality of foils or sheets. Examples of the metal constituting the negative electrode current collector 32 include Cu, Ni, Cr, Au, Pt, Ag, Al, Fe, Ti, Zn, Co, and stainless steel. In particular, the negative electrode current collector 32 may contain at least one metal selected from Cu, Ni, and stainless steel from the viewpoint of ensuring reduction resistance and being difficult to alloy with lithium. The negative electrode current collector 32 may have some kind of coat layer on its surface for the purpose of adjusting resistance or the like. Further, the negative electrode current collector 32 may be a metal foil or a base material on which the above metal is plated or vapor-deposited. Further, when the negative electrode current collector 32 is composed of a plurality of metal foils, some layer may be provided between the metal foils. The thickness of the negative electrode current collector 32 is not particularly limited. For example, the thickness may be 0.1 μm or more or 1 μm or more, or may be 1 mm or less or 100 μm or less.

In addition to the above configuration, the negative electrode 30 may have a general configuration as a negative electrode of a lithium ion battery. For example, a general configuration is a tab, a terminal, or the like. The negative electrode 30 can be manufactured by applying a known method. For example, the negative electrode active material layer 31 is easily formed by, for example, dry or wet molding of a negative electrode mixture containing the above-described various components. The negative electrode active material layer 31 may be formed together with the negative electrode current collector 32 or may be formed separately from the negative electrode current collector 32.

2.4 Other Matters

The lithium ion battery 100 may have each of the above configurations housed inside an exterior body. As the exterior body, any known exterior body of the battery can be adopted. Further, the plurality of lithium ion batteries 100 may be electrically connected to each other, and may be arbitrarily superposed to form a battery pack. In this case, the assembled battery may be housed inside a known battery case. The lithium ion battery 100 may also have a trivial configuration such as necessary terminals. Examples of the shape of the lithium ion battery 100 include a coin type, a laminated type, a cylindrical type, and a square type.

The lithium ion battery 100 can be manufactured by applying a known method. For example, the lithium ion battery 100 can be manufactured as follows. However, the manufacturing method of the lithium ion battery 100 is not limited to the following method, and each layer may be formed by, for example, dry molding or the like.

(1) The positive electrode active material or the like constituting the positive electrode active material layer is dispersed in a solvent to obtain a slurry for the positive electrode layer. The solvent used in this case is not particularly limited, and water and various organic solvents can be used. The positive electrode layer slurry is applied to the surface of the positive electrode current collector using a doctor blade or the like, and then the positive electrode layer slurry is dried, whereby the positive electrode active material layer is formed on the surface of the positive electrode current collector to form a positive electrode.

(2) The negative electrode active material or the like constituting the negative electrode active material layer is dispersed in a solvent to obtain a slurry for the negative electrode layer. The solvent used in this case is not particularly limited, and water and various organic solvents can be used. A negative electrode active material layer is formed on the surface of the negative electrode current collector by coating the negative electrode layer slurry on the surface of the negative electrode current collector using a doctor blade or the like, and then drying the negative electrode layer slurry.

(3) Each layer is laminated so as to sandwich an electrolyte layer (a solid electrolyte layer or a separator) between the negative electrode and the positive electrode, and a laminate having a negative electrode current collector, a negative electrode active material layer, an electrolyte layer, a positive electrode active material layer, and a positive electrode current collector in this order is obtained. Other members such as terminals are attached to the laminated body as needed.

(4) A lithium ion battery is manufactured by storing a laminate in a battery case, filling an electrolytic solution in the battery case in the case of an electrolytic solution battery, immersing the laminate in the electrolytic solution, and sealing the laminate in the battery case. In the case of a battery containing an electrolytic solution, the electrolytic solution may be contained in the negative electrode active material layer, the separator, and the positive electrode active material layer in the step (3).

3. Method for Producing Lithium Ion Conductor

The lithium ion conductor of the present disclosure can be manufactured, for example, through the following steps.

(1) Obtaining a complex halide of $LiGaX_4$ (X is one or more halogens) by mixing lithium halide with gallium halide; and (2) Mixing the composite halide with tetrabutylammonium bis(trifluoromethanesulfonyl)imide 3.1 Lithium Halide Lithium halides include lithium chloride, lithium bromide, lithium iodide, or combinations thereof. The lithium halide may be in a form that can be mixed with gallium halide, and may be, for example, in a particulate form.

3.2 Gallium Halide

Gallium halides include gallium chloride, gallium bromide, gallium iodide, or combinations thereof. The gallium halide may be in a form that can be mixed with lithium halide, and may be, for example, in a particulate form. The valence of gallium in gallium halide may be divalent or trivalent, but particularly when gallium halide is trivalent, high ionic conductivity is easily ensured. That is, $GaX_3$ (X is one or more halogens) may be used as the gallium halide.

3.3 Mixture Ratio of Lithium Halide and Gallium Halide

The mixing ratio of the lithium halide and the gallium halide may be such that $LiGaX_4$ is formed in the lithium ion conductor after mixing. For example, the molar ratio (Li/Ga) of lithium in the lithium halide to gallium in the gallium halide may be 0.5 or more and 1.5 or less. The molar ratio may be 0.6 or more, 0.7 or more, 0.8 or more, or 0.9 or more, and may be 1.4 or less, 1.3 or less, 1.2 or less, or 1.1 or less.

3.4 Means for Mixing Lithium Halide and Gallium Halide

The composite halide constituting the lithium ion conductor of the present disclosure can be produced, for example, by mixing the lithium halide and the gallium halide while applying stress thereto. The stress may be, for example, a frictional force, a shearing force, a shearing stress, an impact force, or the like. Examples of the method of applying such stress at the time of mixing include a method of manually mixing using a mortar or the like, and a method of mixing while being pulverized by a mechanical mixing means such as a ball mill.

3.5 Blend of Complex Halide and TBATFSI

As described above, the lithium ion conductor of the present disclosure can be produced by mixing the composite halide and TBATFSI so that the ratio of the second compound to the sum of the composite halide as the first compound and TBATFSI as the second compound is more than 0 mol % and 30 mol % or less.

3.6 Way to Mix Complex Halides with TBATFSI

The disclosed lithium ion conductor can be produced, for example, by mixing the above-described complex halide and TBATFSI under stresses. The stress may be, for example, a frictional force, a shearing force, a shearing stress, an impact force, or the like. Examples of the method of applying such stress at the time of mixing include a method of manually mixing using a mortar or the like, and a method of mixing while being pulverized by a mechanical mixing means such as a ball mill.

4. Methods of Using Lithium Ion Conductors

Techniques of the present disclosure also have aspects as methods of using lithium ion conductors. That is, the method of using the lithium ion conductor of the present disclosure is characterized by using the lithium ion conductor of the present disclosure under pressure in an electrochemical device. For example, the lithium ion conductor of the present disclosure is used under pressure in at least one of a positive electrode, an electrolyte layer, and a negative electrode of a lithium ion battery. The magnitude of the pressure applied to the lithium ion conductor is not particularly limited. For example, when the lithium ion conductor is contained under pressure in at least one of the positive electrode, the electrolyte layer, and the negative electrode of the lithium ion battery, the pressure applied to the lithium ion conductor may be equal to or greater than 0.1 MPa and equal to or less than 100 MPa, equal to or greater than 1 MPa and equal to or less than 50 MPa, equal to or greater than 5 MPa and equal to or less than 30 MPa.

5. Method for Charging and Discharging Lithium Ion Battery and Method for Improving Cycle Characteristics of Lithium Ion Battery When the lithium ion conductor of the present disclosure is included in at least one of a positive electrode, an electrolyte layer, and a negative electrode of a lithium ion battery, the charge-discharge cycle characteristics of the lithium ion battery are easily improved. That is, a charging and discharging method of the lithium ion battery and a method of improving the cycle characteristics of the lithium ion battery of the present disclosure include repeating charging and discharging of the lithium ion battery, wherein the lithium ion battery has a positive electrode, an electrolyte layer, and a negative electrode, and at least one of the positive electrode, the electrolyte layer, and the negative electrode includes the lithium ion conductor of the present disclosure, and at least a part of the gap is eliminated by the lithium ion conductor of the present disclosure when a gap is generated in at least one of the positive electrode, the electrolyte layer, and the negative electrode in accordance with charging and discharging of the lithium ion battery. Here, the "gap" may be generated in at least one of the positive electrode, the electrolyte layer, and the negative electrode in accordance with a volume change of the active material. The "gap" is a concept including "crack" and the like. It is believed that at least a portion of the gap is eliminated by the ion conductor of the present disclosure (i.e., at least a portion of the gap is filled with the lithium ion conductor of the present disclosure), so that the ion conduction path or the conduction path interrupted by the gap can be recovered.

6. Vehicle Having a Lithium Ion Battery

As described above, when the lithium ion conductor of the present disclosure is included in at least one of the positive electrode, the electrolyte layer, and the negative electrode of the lithium ion battery, the charge-discharge cycle characteristics of the lithium ion battery can be expected to be improved. The lithium ion batteries having excellent charge-discharge cycling properties can be suitably used in at least one type of vehicles selected from, for example, hybrid electric vehicle (HEV), plug-in hybrid electric vehicle (PHEV) and battery electric vehicle (BEV). That is, the technology of the present disclosure also has an aspect as a vehicle including a lithium ion battery, wherein the lithium ion battery includes a positive electrode, an electrolyte layer, and a negative electrode, and at least one of the positive electrode, the electrolyte layer, and the negative electrode includes the lithium ion conductor of the present disclosure.

As described above, an embodiment of the lithium ion conductor, the lithium ion battery, and the method of manufacturing the lithium ion conductor of the present disclosure has been described, but various modifications can be made to the lithium ion conductor, the lithium ion battery, and the method of manufacturing the lithium ion conductor of the present disclosure in addition to the above embodiment without departing from the gist thereof. Hereinafter, the technique of the present disclosure will be described in more detail with reference to examples. However, the technique of the present disclosure is not limited to the following examples.

1. Synthesis of Complex Halides

1.1 Reference Example 1

LiCl (manufactured by High-purity Chemical Co., Ltd.) and $GaCl_3$ (manufactured by Tokyo Chemical Industry Co., Ltd.) are weighed so as to be 50:50 in a molar ratio, put into a $ZrO_2$ pot of 500 ml, put a $ZrO_2$ ball of φ5 mm, heptane (manufactured by Kanto Chemical Co., Ltd.) in a 100 g state, it is pulverized for 1 hour at a rotational speed 300 rpm, this is repeated 20 sets. The mix is dried to give $LiGaCl_4$.

1.2 Reference Example 2

Except that LiI (manufactured by High-Purity Chemical Co., Ltd.) was used instead of LiCl and $GaI_3$ (manufactured by Aldrich Co., Ltd.) was used instead of $GaCl_3$, mixing was performed in the same manner as in Reference Example 1 to obtain $LiGaI_4$. $LiGaCl_4$ and $LiGaI_4$ synthesized in the same manner as in Reference Example 1 are mixed so as to have a molar ratio of 80:20, and heated and stirred at a temperature equal to or higher than the melting point to obtain a melt. After the obtained melt is cooled to room temperature, the melt is ground in a mortar to obtain $80LiGaCl_4$-$20LiGaI_4$.

1.3 Reference Example 3

Except that $LiGaCl_4$ and $LiGaI_4$ were mixed so as to have a molar ratio of 50:50, $50LiGaCl_4$-$50LiGaI_4$ is obtained in the same manner as in Reference Example 2.

1.4 Reference Example 4

Except that LiBr (manufactured by High-Purity Chemical Co., Ltd.) was used instead of LiCl and $GaBr_3$ (manufactured by Alpha Co.) was used instead of $GaCl_3$, mixing was performed in the same manner as in Reference Example 1 to synthesize $LiGaBr_4$. $LiGaCl_4$ and $LiGaBr_4$ synthesized in the same manner as in Reference Example 1 are mixed so as to have a molar ratio of 80:20, and heated and stirred at a temperature equal to or higher than the melting point to obtain a melt. After the obtained melt is cooled to room temperature, the melt is ground in a mortar to obtain $80LiGaCl_4$-$20LiGaBr_4$.

1.5 Reference Example 5

Except that $LiGaCl_4$ and $LiGaBr_4$ were mixed so as to have a molar ratio of $50LiGaCl_4$-$50LiGaBr_4$ is obtained in the same manner as in Reference Example 4.

1.6 Reference Example 6

Except that $LiGaCl_4$ and $LiGaBr_4$ were mixed at a molar ratio of 20:80, $20LiGaCl_4$-$80LiGaBr_4$ is obtained in the same manner as in Reference Example 4.

1.7 Reference Example 7

Except that LiBr (manufactured by High-Purity Chemical Co., Ltd.) was used instead of LiCl, and $GaBr_3$ (manufactured by Alpha Co., Ltd.) was used instead of $GaCl_3$, mixing was performed in the same manner as in Reference Example 1 to obtain $LiGaBr_4$.

1.8 Reference Example 8

The melt is obtained by mixing $LiGaBr_4$ and $LiGaI_4$ in a molar ratio of 80:20 and heating and stirring at a temperature equal to or higher than the melting point. After the obtained melt is cooled to room temperature, the melt is ground in a mortar to obtain $80LiGaBr_4$-$20LiGaI_4$.

1.9 Reference Example 9

The melt is obtained by mixing $LiGaBr_4$ and $LiGaI_4$ in a molar ratio of 70:30 and heating and stirring at a temperature equal to or higher than the melting point. After the obtained melt is cooled to room temperature, the melt is ground in a mortar to obtain $70LiGaBr_4$-$30LiGaI_4$.

1.10 Reference Example 10

The melt is obtained by mixing $LiGaBr_4$ and $LiGaI_4$ in a molar ratio of 60:40 and heating and stirring at a temperature equal to or higher than the melting point. After the obtained melt is cooled to room temperature, the melt is ground in a mortar to obtain $60LiGaBr_4$-$40LiGaI_4$.

1.11 Reference Example 11

The melt is obtained by mixing $LiGaBr_4$ and $LiGaI_4$ in a molar ratio of 50:50 and heating and stirring at a temperature equal to or higher than the melting point. After the obtained melt is cooled to room temperature, the melt is ground in a mortar to obtain $50LiGaBr_4$-$50LiGaI_4$.

1.12 Reference Example 12

The melt is obtained by mixing $LiGaBr_4$ and $LiGaI_4$ in a molar ratio of 40:60 and heating and stirring at a temperature equal to or higher than the melting point. After the obtained melt is cooled to room temperature, the melt is ground in a mortar to obtain $40LiGaBr_4$-$60LiGaI_4$.

1.13 Reference Example 13

The melt is obtained by mixing $LiGaBr_4$ and $LiGaI_4$ in a molar ratio of 40:60 and heating and stirring at a temperature equal to or higher than the melting point. After the obtained melt is cooled to room temperature, the melt is ground in a mortar to obtain $20LiGaBr_4$-$80LiGaI_4$.

1.14 Reference Example 14

LiCl and $AlCl_3$ (Wako Pure Chemical Co., Ltd.) was weighed so as to be 50:50 in molar ratio, put into a $ZrO_2$ pot of 500 ml, put $ZrO_2$ ball φ5 mm, with 100 g of heptane (Kanto Chemical Co., Ltd.), subjected to grinding for 1 hour at a rotational speed 300 rpm, this is repeated 20 sets. The mix is dried to give $LiAlCl_4$.

1.15 Reference Example 15

A Li—P—S—I—Br sulfide solid-electrolyte is provided.

2. Confirmation of the Crystal Structure

Figure 2:
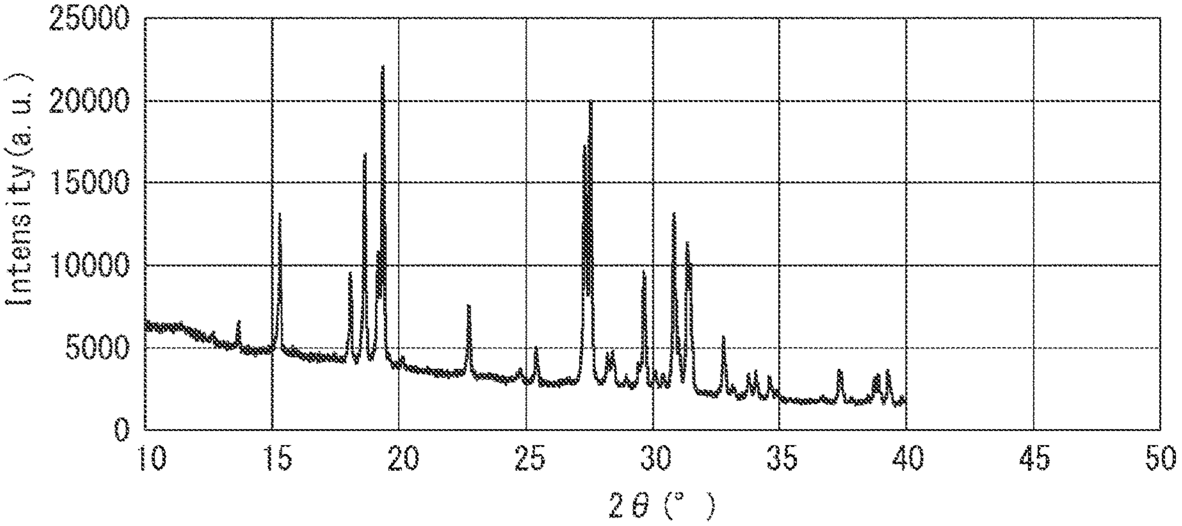
FIG. 2 shows the X-ray diffractogram of $LiGaCl_4$.

FIG. 2 shows the X-ray diffractogram for $LiGaCl_4$ of Reference 1. As is apparent from FIG. 2, in the X-ray diffracted peak for $LiGaCl_4$ obtained after mixing by the ball mill, the peak derived from LiCl and $GaCl_3$ as the raw material is not substantially confirmed (or the peak is reduced compared to the raw material as it is). That is, it can be seen that the crystalline phase differs from LiCl and $GaCl_3$, and specifically, the crystalline phase related to $LiGaCl_4$. The same applies to $LiGaBr_4$ of Reference Example 7. That is, in the X-ray diffracted peak for $LiGaBr_4$ obtained after mixing by the ball mill, the peak derived from LiBr and $GaBr_3$ as the raw material is not substantially confirmed (or, the peak is reduced compared to the raw material as it is). That is, the crystalline phase differs from LiBr and $GaBr_3$, specifically, the crystalline phase according to $LiGaBr_4$. In addition, it was confirmed that each of Reference Example 2 to Reference Example 6 and Reference Example 8 to Reference Example 13 had a eutectic structure of a composite halide.

3. Measurement of Ionic Conductivity

The ionic conductivity of each of the compounds of Reference Example 1 to Reference Example 15 is measured. Specifically, the compound 150 mg is filled in a cylinder and uniaxially pressed to produce a pelletized cell. An impedance measurement at 25° C. is carried out in a thermostatic bath while this is placed in a desiccator. The ion conductivity after pressing is calculated from the obtained resistance value and the sample thickness. The pellet cell is left in the thermostat for a certain period of time, and the resistance value at the time when the resistance decrease is saturated is read, and the ion conductivity after storage is calculated.

4. Preparation and Evaluation of Battery for Evaluation

4.1 Application Reference Example 1

4.1.1 Preparation of Negative Electrode Mixture

The sulfide solid electrolyte of Reference Example 15 and the molten salt of Reference Example 2 are weighed so as to have a volume ratio of 80:20, and a mixed electrolyte is obtained. The crystalline Si as the negative electrode active material, the mixed electrolyte, and VGCF as the conductive auxiliary agent are mixed in a mortar to obtain a negative electrode mixture.

4.1.2 Preparation of Positive Electrode Composite Material

NCM($LiNi_{1/3}Co_{1/3}Mn_{1/3}O_2$) coated with $LiNbO_3$ as a positive electrode active material, the sulfide solid electrolyte of Reference Example 15, and VGCF as a conductive auxiliary agent are mixed in a mortar to obtain a positive electrode mixture.

4.1.3 Cell Fabrication

With the positive electrode mixture, the sulfide solid electrolyte of Reference Example 15, and the negative electrode mixture layered on the alumina cylinder of φ11.28 mm, a 6 t press is performed to obtain a laminate comprising a positive electrode mixture layer/sulfide solid electrolyte layer/negative electrode mixture layer. By constraining the stack with 6 N, an all-solid-state cell for assessment is produced.

4.1.4 Charge/Discharge Cycle Test

The all-solid-state battery thus produced is charged and discharged CCCV at ⅓ C charge and discharge rates for 50 cycles at room temperature, and the capacity retention ratio is calculated as the ratio of the capacity after 50 cycles to the initial capacity.

4.2 Application Reference Example 2

In the negative electrode mixture, except that $LiAlCl_4$ of Reference Example 14 was used instead of the molten salt of Reference Example 2, an all-solid-state battery was manufactured in the same manner as in Application Reference Example 1, and a charge-discharge cycling test was performed.

4.3 Application Reference Example 3

Except that only the sulfide solid electrolyte of Reference Example 15 is used as the electrolyte in the negative electrode mixture, an all-solid-state battery is manufactured in the same manner as in Application Reference Example 1, and a charge-discharge cycle test is performed.

5. Evaluation Results

Figure 3:
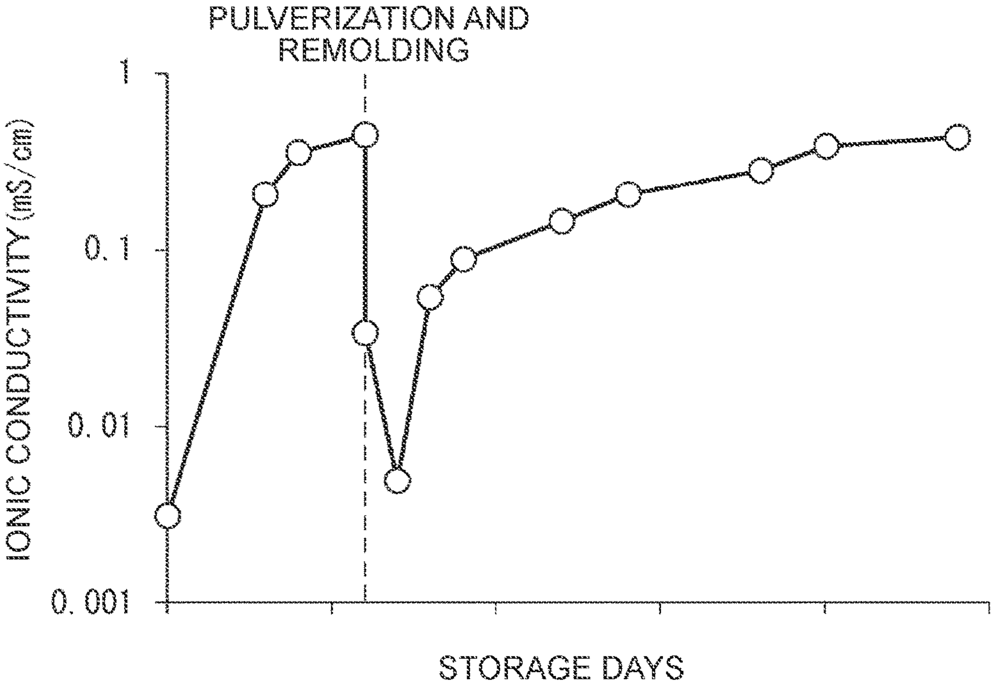
FIG. 3 shows the time-dependence of the ionic conductivity of pellet cells under pressure.

Table 1 below shows the types and ionic conductivities of the compounds of Reference Example 1 to Reference Example 15. In addition, Table 2 below shows the measurement results of the capacity retention rates of all the solid-state batteries in each of Application Reference Examples 1 to 3. Furthermore, FIG. 3 shows the time dependence of the ion conductivity of the pellet cell of Reference Example 2.

TABLE 1

| | Type | Room temperature conductivity (immediately after pressing) [mS/cm] | Room temperature conductivity (after storage) [mS/cm] | Conductivity Increase [Times] |
|---|---|---|---|---|
| Reference Example 1 | $LiGaCl_4$ | 0.0047 | 0.62 | 132 |
| Reference Example 2 | $80LiGaCl_4$—$20LiGaI_4$ | 0.0011 | 0.69 | 615 |
| Reference Example 3 | $50LiGaCl_4$—$50LiGaI_4$ | 0.00067 | 0.084 | 125 |

TABLE 1-continued

| | Type | Room temperature conductivity (immediately after pressing) [mS/cm] | Room temperature conductivity (after storage) [mS/cm] | Conductivity Increase [Times] |
|---|---|---|---|---|
| Reference Example 4 | $80LiGaCl_4$—$20LiGaBr_4$ | 0.034 | 0.064 | 1.9 |
| Reference Example 5 | $50LiGaCl_4$—$50LiGaBr_4$ | 0.024 | 0.099 | 4.1 |
| Reference Example 6 | $20LiGaCl_4$—$80LiGaBr_4$ | 0.084 | 0.18 | 2.1 |
| Reference Example 7 | $LiGaBr_4$ | 0.0087 | 0.50 | 58 |
| Reference Example 8 | $80LiGaBr_4$—$20LiGaI_4$ | 0.00089 | 1.55 | 1746 |
| Reference Example 9 | $70LiGaBr_4$—$30LiGaI_4$ | 0.00089 | 1.72 | 1931 |
| Reference Example 10 | $60LiGaBr_4$—$40LiGaI_4$ | 0.00032 | 1.87 | 5927 |
| Reference Example 11 | $50LiGaBr_4$—$50LiGaI_4$ | 0.00055 | 1.75 | 3170 |
| Reference Example 12 | $40LiGaBr_4$—$60LiGaI_4$ | 0.00025 | 4.84 | 19023 |
| Reference Example 13 | $20LiGaBr_4$—$80LiGaI_4$ | 0.00023 | 0.12 | 516 |
| Reference Example 14 | $LiAlCl_4$ | 0.00013 | 0.000060 | 0.5 |
| Reference Example 15 | Li—P—S—I—Br | 4.76 | 4.69 | 1.0 |

TABLE 2

| | Sulfide solid electrolyte in negative electrode mixture | Composite halide in the negative electrode mixture | Capacity retention rate (after 50 cycles) |
|---|---|---|---|
| Application Reference Example 1 | Li—P—S—I—Br | $80LiGaCl_4$—$20LiGaI_4$ | 85% |
| Application Reference Example 2 | Li—P—S—I—Br | $LiAlCl_4$ | 76% |
| Application Reference Example 3 | Li—P—S—I—Br | None | 79% |

The results shown in Tables 1 and 2 and FIG. 3 show the following.

As shown in Table 1, it can be seen that the composite halide of Reference Example 1 to Reference Example 13 has a gradual improvement in ionic conductivity even at room temperature (25° C.) when the pressurized state is maintained. That is, it is considered that the composite halide of Reference Example 1 to Reference Example 13 has a "room temperature sintering mechanism" in which the interface resistance disappears or decreases even at room temperature in a pressurized state. Specifically, the composite halide according to Reference Example 1 to Reference Example 13 is sintered at room temperature when pressurized to form a pellet cell, the interface resistance gradually disappears, and the ionic conductivity increases. As shown in FIG. 3, when the pellet cell is pulverized and pressure-molded again to form a pellet cell, it can be seen that the interface resistance disappears and the ionic conductivity increases as before the pulverization. That is, it can be seen that the composite halide of Reference Example 13 from Reference Example 1 can repeatedly cause room temperature sintering and loss of interface resistance by pressurization. The composite halide according to Reference Example 1 to Reference Example 13 is relatively soft and can follow the deformation of the surrounding material. When such a composite halide is applied in a lithium ion battery, it is considered that even if the active material expands and contracts during charging and discharging and cracks or the like occur in the solid electrolyte, the crack interface is repeatedly repaired by the composite halide. As a result, as shown in Table 2, the cycle characteristics of the battery are improved, and a high capacity can be maintained before and after the charge-discharge cycle. Such an effect is not confirmed in Reference Examples 14 and 15, and it can be seen that the effect is peculiar to the complex halide of Li and Ga.

In Reference Example 1 to Reference Example 13, the composite halide represented by $LiGaX_4$ (X is one or more halogens) is applied to the negative electrode of the lithium ion battery, but the composite halide may be included in any of the positive electrode, the electrolyte layer, and the negative electrode, and the desired effect may be obtained. In particular, by being included in the negative electrode, a higher effect can be expected. For example, when an alloy-based active material (Si, Si alloy, Sn, Sn alloy, or the like, particularly Si) is used as the negative electrode active material, expansion and contraction of the negative electrode active material during charging and discharging are large, and cracking, peeling, and the like are likely to occur in the negative electrode with charging and discharging. Therefore, by including the above-described composite halide, the crack interface is repaired by the lithium ion conductor, and the interruption of the ion conduction path or the like is easily remarkably suppressed.

Further, in Reference Example 1 to Reference Example 13 described above, the composite halide represented by $LiGaX_4$ (X is one or more halogens) is applied to an all-solid-state lithium ion battery substantially free of liquid, but the composite halide is also applicable to a lithium-ion battery containing a liquid. However, when the composite halide is used together with the solid electrolyte, the effect of repairing cracking or peeling of the solid electrolyte is likely to be exerted. That is, when the composite halide is applied to a battery including a solid electrolyte, a higher effect can be expected.

6. Complexation with Organic Salts

When $LiGaX_4$ (X is one or more halogens) and an organic salt are combined, the same evaluation as described above is performed.

6.1 Example 1

$LiGaBr_4$ obtained in Reference Example 7 and tetrabutylammonium bis(trifluoromethanesulfonyl)imide (also referred to as TBATFSI(TBATFSA) and Aldrich are weighed so as to have a molar ratio of 90:10, and mixed in a mortar to obtain a mixed product. The mixture is heated and stirred on a hot stirrer to around 100° C. to obtain a composite.

6.2 Example 2

Complexes are obtained in the same manner as in Example 1, except that $LiGaBr_4$ and TBATFSI are mixed in a molar ratio of 80:20.

6.3 Example 3

Complexes are obtained in the same manner as in Example 1, except that $LiGaBr_4$ and TBATFSI are mixed in a molar ratio of 70:30.

6.4 Comparative Example 1

Complexes are obtained in the same manner as in Example 1, except that $LiGaBr_4$ and TBATFSI are mixed in a molar ratio of 60:40.

6.5 Comparative Example 2

Complexes are obtained in the same manner as in Example 1, except that $LiGaBr_4$ and TBATFSI are mixed in a molar ratio of 50:50.

6.6 Comparative Example 3

Complexes are obtained in the same manner as in Example 1, except that $LiGaBr_4$ and TBATFSI are mixed in a molar ratio of 20:80.

7. Measurement of Ionic Conductivity

The ionic conductivity of each of the composites of Examples 1 to 3 and Comparative Examples 1 to 3 is measured. The measurement method is the same as that described above. The results are shown in Table 3 below. Incidentally, in Table 3 below, the ion conductivity increase rate of Reference Example 7 is set to 100, and the ion conductivity increase rates of Example 1 to Example 3 and Comparative Example 1 to Comparative Example 3 are shown as relative.

TABLE 3

| | Type | Room temperature conductivity (immediately after pressing) [mS/cm] | Room temperature conductivity (after storage) [mS/cm] | Conductivity Increase [Times] |
|---|---|---|---|---|
| Reference Example 7 | LiGaBr4 | 0.0087 | 0.50 | 100 |
| Example 1 | $90LiGaBr_4$—10TBATFSI | 0.0043 | 1.05 | 210 |
| Example 2 | $80LiGaBr_4$—20TBATFSI | 0.00021 | 2.01 | 402 |
| Example 3 | $70LiGaBr_4$—30TBATFSI | 0.00019 | 1.36 | 272 |
| Comparative Example 1 | $60LiGaBr_4$—40TBATFSI | 0.00016 | 0.00034 | 0.068 |
| Comparative Example 2 | $50LiGaBr_4$—50TBATFSI | 0.00021 | 0.00024 | 0.048 |
| Comparative Example 3 | $20LiGaBr_4$—80TBATFSI | 0.00034 | 0.00035 | 0.070 |

As is apparent from the results shown in Table 3, the composites according to Examples 1 to 3 tend to be lower than the ionic conductivity of the lithium ion conductor composed only of the composite halide when not placed in a pressurized state. This is believed to be due to the ionic conductivity of TBATFSI alone being lower than that of the complex halide alone. However, when the composite is placed under pressure, the ionic conductivity of the composite tends to be higher than the ionic conductivity of the composite halide alone. This is considered to be because the complex halide and TBATFSI exert some interaction under pressure. For example, the presence of TBATFSI may accelerate room temperature sintering mechanisms and further reduce interfacial resistivity. As shown in Table 3, the ionic conductivity after pressure holding of the composites according to Examples 1 to 3 can be 1.0 mS/cm or higher. This is comparable to the ionic conductivity of a sulfide-based solid electrolyte. In addition, the composites according to Examples 1 to 3 contain TBATFSI, which is an organic material, and thus are highly flexible. Therefore, when the composites according to Examples 1 to 3 are applied to various electrochemical devices, the composites easily follow the deformation or the like of the surrounding materials. That is, a gap caused by deformation, cracking, or the like of the material is filled by the composite, and interruption or the like of the ion conduction path hardly occurs.

On the other hand, as is clear from the results shown in Table 3, in Comparative Example 1 to Comparative Example 3, since the ratio of TBA in the complex was too large, the increase in the ionic conductivity in the pressurized condition was rather small.

From the results shown in Table 1 to Table 3, the lithium ion conductor having the structure (3) from the following configuration (1) is soft, and has a property in which the ion conductivity increases in the pressurized state, and generates a reaction such as a sintering reaction even at a low temperature of about room temperature, it can be said to have a high ion conductivity at the time of pressurization. When such a lithium ion conductor is contained in at least one of an electrode and an electrolyte layer of a lithium ion battery, for example, even when a crack occurs in the electrode or the electrolyte layer, the interface of the crack is repaired by the lithium ion conductor, and the interruption of the lithium ion conduction path is unlikely to occur.

(1) The first compound includes a complex halide represented by $LiGaX_4$ (X is one or more halogens).

(2) The second compound includes tetrabutylammonium bis(trifluoromethanesulfonyl)imide.

(3) The ratio of the second compound in the sum of the first compound and the second compound is more than 0 mol % and 30 mol % or less.

Incidentally, in Example 1 to Example 3 described above, $LiGaBr_4$ was employed as the composite halide, from the results shown in Tables 1 and 2, the composite halide other than $LiGaBr_4$ and $LiGaX_4$, the same effect can be expected. Further, in Examples 1 to 3 described above, an example in which TBATFSI is employed as the organic salt is exemplified, but it is considered that some of the organic salts having cations other than TBA and anions other than TFSI exhibit the same effects as described above. For example, lithium ion conductors containing at least one of the organic salts having ammonium cations other than TBA, phosphonium salts, sulfonium salts, pyridinium salts, pyrrolidinium salts, piperidinium salts, imidazolium salts, organic salts having sulfonylimide anions other than TFSI, and complex halides may also have soft and increased ionic conductivity properties in pressurized conditions.

What is claimed is:

1. A lithium ion conductor comprising:

a first compound; and a second compound, wherein:

the first compound is a complex halide having a eutectic structure composed of at least two $LiGaX_4$ selected from $LiGaBr_4$, $LiGaCl_4$ and $LiGaI_4$, where a molar ratio between the at least two $LiGaX_4$ is between 1/4 and 4;

the second compound is tetrabutylammonium bis(trifluoromethanesulfonyl)imide; and a ratio of the second compound to a sum of the first compound and the second compound is more than 0 mol % and 30 mol % or less.

2. A lithium ion battery comprising:

a positive electrode;

an electrolyte layer; and a negative electrode, wherein at least one of the positive electrode, the electrolyte layer, and the negative electrode includes the lithium ion conductor according to claim 1.

3. The lithium ion battery according to claim 2, wherein at least one of the positive electrode, the electrolyte layer, and the negative electrode includes the lithium ion conductor and a sulfide solid electrolyte.

4. The lithium ion conductor according to claim 1, wherein the at least two $LiGaX_4$ comprise $LiGaBr_4$ and $LiGaCl_4$.

5. The lithium ion conductor according to claim 1, wherein the at least two $LiGaX_4$ comprise $LiGaBr_4$ and $LiGaI_4$.

6. The lithium ion conductor according to claim 1, wherein the at least two $LiGaX_4$ comprise $LiGaCl_4$ and $LiGaI_4$.

7. The lithium ion conductor according to claim 1, wherein the molar ratio between the at least two $LiGaX_4$ is 3/7 to 7/3.

8. The lithium ion conductor according to claim 1, wherein the molar ratio between the at least two $LiGaX_4$ is 2/3 to 3/2.

9. The lithium ion conductor according to claim 1, wherein the ratio of the second compound to the sum of the first compound and the second compound is 1 mol % or more and 25 mol % or less.

10. The lithium ion conductor according to claim 1, wherein the ratio of the second compound to the sum of the first compound and the second compound is 10 mol % or more and 20 mol % or less.

* * * * *